United States Patent
Crossley

(10) Patent No.: US 9,904,680 B2
(45) Date of Patent: Feb. 27, 2018

(54) AUTOMATED MILESTONE PREDICTION AND PRESENTATION

(71) Applicant: CBS INTERACTIVE INC., San Francisco, CA (US)

(72) Inventor: Brett Marcus Crossley, Salisbury, NC (US)

(73) Assignee: CBS Interactive Inc., New York, NY (US)

( * ) Notice: Subject to any disclaimer, the term of this patent is extended or adjusted under 35 U.S.C. 154(b) by 915 days.

(21) Appl. No.: 13/693,559

(22) Filed: Dec. 4, 2012

(65) Prior Publication Data

US 2014/0155177 A1 Jun. 5, 2014

(51) Int. Cl.
*G06F 17/30* (2006.01)
*G06Q 10/00* (2012.01)

(52) U.S. Cl.
CPC .......... *G06F 17/30* (2013.01); *G06Q 10/00* (2013.01)

(58) Field of Classification Search
CPC .... G06F 17/00; G06F 17/30; G06F 17/30861; A63F 9/24; G06Q 10/00
See application file for complete search history.

(56) References Cited

U.S. PATENT DOCUMENTS

| 8,400,436 | B1 * | 3/2013 | Kuck et al. ................... 345/204 |
| 2002/0087643 | A1 * | 7/2002 | Parsons ................... G06F 9/542 |
| | | | 709/206 |
| 2004/0249848 | A1 * | 12/2004 | Carlbom et al. .............. 707/102 |
| 2008/0064490 | A1 * | 3/2008 | Ellis ................................ 463/25 |
| 2008/0109823 | A1 * | 5/2008 | Whitfield ................ G06F 9/445 |
| | | | 719/318 |
| 2008/0113809 | A1 * | 5/2008 | David ..................... G07F 17/32 |
| | | | 463/42 |
| 2009/0176557 | A1 * | 7/2009 | Hall ........................ A63F 13/12 |
| | | | 463/25 |
| 2012/0214575 | A1 * | 8/2012 | Amaitis et al. .................. 463/25 |
| 2013/0325404 | A1 * | 12/2013 | Yuen et al. .................... 702/182 |
| 2014/0051506 | A1 * | 2/2014 | Ameling ................ G06Q 99/00 |
| | | | 463/29 |

* cited by examiner

*Primary Examiner* — James S McClellan
*Assistant Examiner* — Syvila Weatherford

(57) ABSTRACT

Various embodiments are generally directed to automated identification and prediction of game milestones, and to automated presentation of those predictions and of the milestones as they are achieved. A method comprises searching statistical data for an indication of a milestone specified in an alerts data towards achievement of which an extent of progress has been made; identifying the milestone in the statistical data; predicting a time required to achieve the milestone; comparing the predicted time required to a condition specified in the alerts data; comparing the predicted time required to an indication of time that remains in scheduled game events in a game season in a scheduling data; and transmitting an alert that predicts achievement of the milestone based on the predicted time required meeting the condition and on the time that remains in the season providing at least the predicted time required. Other embodiments are described and claimed herein.

24 Claims, 10 Drawing Sheets

AUTOMATED MILESTONE PREDICTION AND PRESENTATION

BACKGROUND

Many varieties of games, including most forms of organized sports, are played as a series of game events (where game play actually occurs) throughout what is often called a "season" that occurs only once a year over the course of a few weeks or months. Within that yearly season, the interval of time between game events (during which no game play occurs) can vary greatly from only a day or two to multiple weeks. During the lengthier intervals of time between game events, some audience members may lose interest and may become less inclined to again devote time to attending, watching, listening to or otherwise following the play of subsequent game events.

In contrast, other audience members may maintain considerably greater interest in the progress of a particular player or team as a season progresses, and may desire to be frequently presented with information concerning details of that player's or team's progress. Such avidly interested audience members are frequently quite knowledgeable about the history, rules and/or notable milestones of a game (especially where the game is an organized sport), and desire to be kept abreast of various statistical developments as they occur in as close to real time as possible.

Satisfying the need to hold audience member interest and to provide the kinds of statistical information that more avidly interested audience members desire often falls to an individual (often referred to in organized sports as a "sports information director") who is associated with an organization to which a particular player belongs or is associated with a school or college to which a particular team belongs. It is frequently the case that such an individual is unable to entirely devote their time to such tasks as they frequently fulfill many roles within their organization or educational institution (e.g., coaching, instruction, team logistics, fund-raising, etc.). Unfortunately, maintaining the historical knowledge, gathering statistics from game events occurring in a current season and reviewing statistics thoroughly to identify upcoming and currently achieved milestones can be time consuming tasks.

It is with respect to these and other considerations that the techniques described herein are needed.

DETAILED DESCRIPTION

Figure 1:
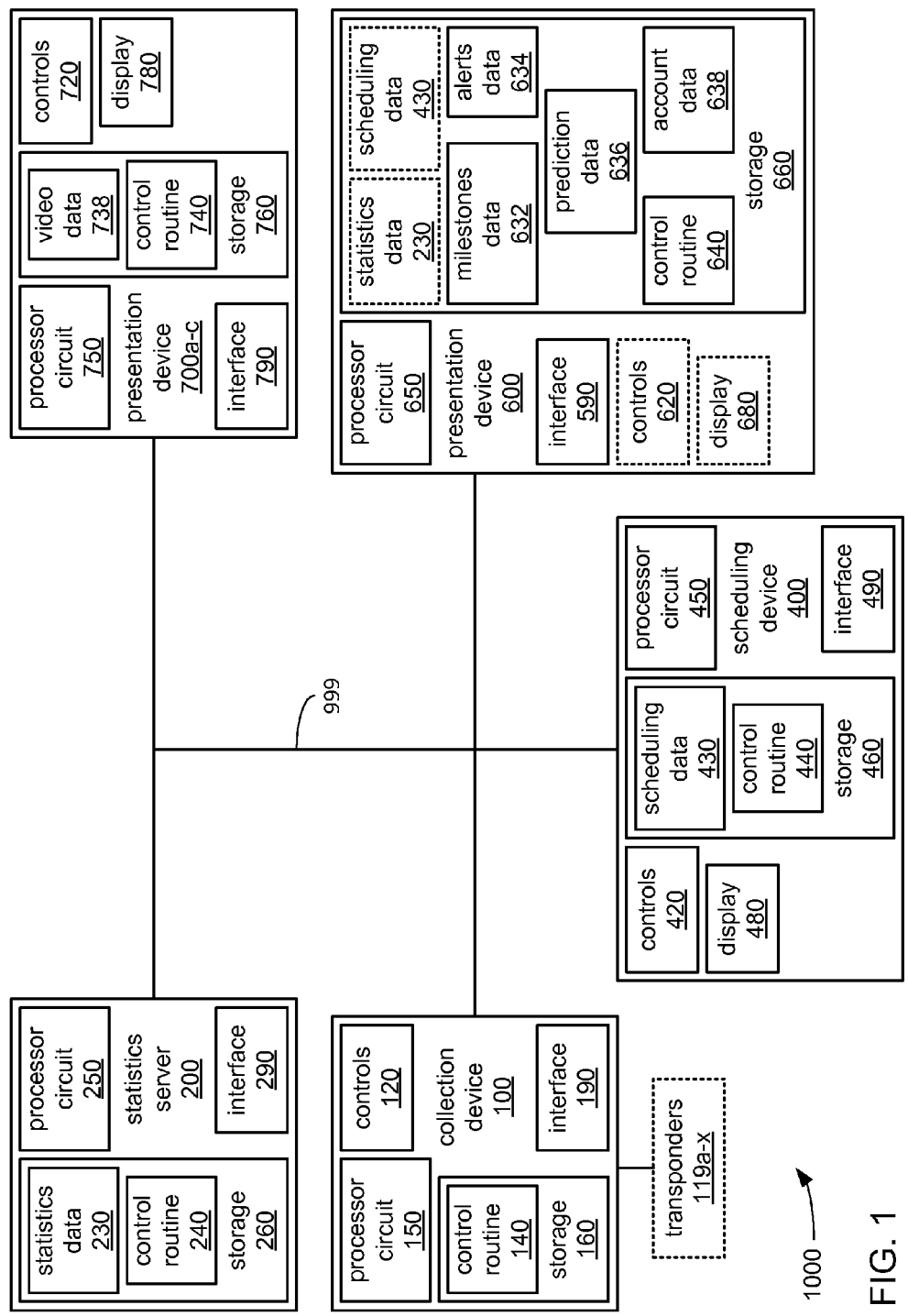
FIG. 1 illustrates a first embodiment of interaction among computing devices.

Various embodiments are generally directed to automated identification and prediction of milestones at game events, and to automated presentation of those predictions and of the milestones as they are achieved. Some embodiments are particularly directed to automated searching of a database of statistics of one or more players or teams to determine what milestones have been achieved, automated calculations to predict when upcoming milestones may be achieved, and automated presentation of predictions and/or achievement of milestones to members of an audience of that team or of that game.

More specifically, as a game event is played, each play of that game event generates statistical information that is collected by a collection device and is added to a statistics data that comprises statistical information related to the same player(s) and/or team(s) that are playing in that game event. During play of the game event, a presentation server searches the statistics data to identify instances in which specified milestones are achieved. The presentation server also employs a scheduling data comprising at least a schedule of games events played and/or to be played along with searches of the statistics data as inputs into a statistical analysis to predict upcoming instances in which specified milestones are likely to be achieved.

As play continues and/or following play of a game event, the presentation server automatically transmits announcements of achievements of milestones occurring in that game event employing specified text to various presentation devices of audience members. Further, as the play of a game event continues and/or following play, the presentation server determines a specified number of milestones that are likely to be achieved most immediately in the future, and transmits alerts of predictions of those achievements of milestones to those presentation devices.

As will be explained in greater detail, the presentation server retrieves a milestones data specifying the milestones to be searched for and the text(s) to be employed in announcing their achievement. Further, the presentation server also retrieves an alerts data specifying the conditions triggering transmission of an alert of a prediction of one of those specified milestones and the text(s) to be employed in announcing their achievement. It is envisioned that the statistical data and the milestones specified will be centered largely on a specific team of an educational institution and/or centered on players belonging to a specific club in a specific organized sport, and will therefore tend to be centered on automated transmittals of such information to fans of that team and/or those players. However, it should be noted that what is described and claimed herein is applicable to a broader range of types of games, including so-called "fantasy" games in which fictitious teams are assembled using real players, broadcast entertainment games in which non-athletes are subjected to a series of challenges in episodes of a television program (e.g., a "reality TV" show), board games such as chess or checkers, etc.

By way of example, a computer-implemented method comprises searching statistical data associated with at least one player of a game for an indication of a first milestone specified in an alerts data towards the achievement of which an extent of progress has been made; identifying the first milestone in the statistical data; predicting a time required in a current season of the game to achieve the first milestone; comparing the predicted time required to a condition specified in the alerts data; comparing the predicted time required to an indication of time that remains in scheduled game events in the season in a scheduling data; and transmitting an alert that predicts achievement of the first milestone based on the predicted time required meeting the condition and based on the time that remains in the season providing at least the predicted time required. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of a milestone presentation system 1000 comprising one or more of a collection device 100; a statistics server 200; a scheduling device 400; a presentation server 600; and presentation devices 700*a*, 700*b* and 700*c*. Each of the computing devices 100, 200, 400, 600 and 700*a-c* may be any of a variety of types of computing device, including without limitation, a desktop computer system, a data entry terminal, a laptop computer, a netbook computer, an ultrabook computer, a tablet computer, a handheld personal data assistant, a smartphone, a body-worn computing device incorporated into clothing, a computing device integrated into a vehicle (e.g., a car, a bicycle, a wheelchair, etc.), a server, a cluster of servers, a server farm, etc.

As depicted, the computing devices 100, 200, 400, 600 and 700*a-c* exchange signals concerning statistical data related to one or more game events of one or more games through portions of at least one network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

The collection device 100 receives statistical information concerning the play of a game event. As play of that game event continues and/or at the conclusion of such play, the collection device 100 provides its statistical information to the statistics server 200 via the network 999, which stores this statistical information as a statistics data 230. The scheduling device 400 maintains a scheduling data 430 comprising a schedule of game events to be played, including the game event for which the collection device 100 receives statistical information. While the game event is in play and/or following the end of play, the presentation server 600 receives the statistics data 230 from the statistics server 200 and the scheduling data 430 from the scheduling device 400.

The presentation server 600 searches the statistics data 230 for instances in which milestones specified in a milestone data 632 are achieved, and transmits announcements of such achievements to one or more of the presentation devices 700*a-c*. The presentation server 600 also employs the scheduling data 430 in performing a statistical analysis of the statistical data 230 to predict which milestones specified in an alerts data 634 will soon be achieved, taking into account upcoming game event opportunities to do so, and storing indications of those predictions as a prediction data 636. The alerts data 634 also specifies conditions under which alerts concerning those predictions are to be transmitted by the presentation server 600 to one or more of the presentation devices 700*a-c*. In making such transmissions, the presentation server 600 refers to an account data 638 that specifies what is to be transmitted to different ones of the presentation devices 700*a-c* and/or in what format(s).

In various embodiments, the collection device 100 comprises a storage 160 storing a control routine 140, a processor circuit 150, controls 120 and an interface 190 coupling the collection device 100 to the network 999. In executing a sequence of instructions of at least the control routine 140, the processor circuit 150 of the collection device 100 is caused to await receipt of signals indicative of statistical information associated with the play of a game event. The signals awaited may be signals indicative of operation of the controls 120 (e.g., keys of a keyboard or keypad, a mouse, a touchpad, a touchscreen, etc.) by a person monitoring the game event and thereby entering statistical information into the collection device 100. In other words, the signals awaited may be indicative of manual entry of statistical information arising from each play of a game event in progress. Alternatively or additionally, and as depicted, the signals awaited may be signals received by a component of the interface 190 from one or more of the transponders 119*a-x* disposed about various locations related to a game in progress. More specifically, in some games, transponders are carried by players, racing vehicles, locations of goals, etc. in a game event to enable automated tracking of movement and/or to detect successful scoring.

The exact nature of the statistical information collected by the collection device 100 depends on the type of game played. Thus, the statistical information could include one or more of distances run, bicycled, driven, jumped, thrown, etc. by particular players; distances by which a ball is moved in a given direction across a field; goals scored; fastest times; number of laps and/or pit stops; number of timeouts and/or penalty points; number of holes-in-one and/or under par; number of swings, misses, balls, strikes, spares, fouls, home runs and/or outs; fastest pitch and/or longest kick; number of enemy soldiers caught or killed; number of times being killed; number of planes shot down or times acquiring "flying ace" status; number of instances of checking a king, checkmate, or crowning a king; number of properties acquired on "Park Avenue" or their value; etc. The collection device 100 signals the statistics server 200 with an indication of the current state of play of the game event it monitors (e.g., ongoing, ended, postponed, etc.) as well as with statistical information.

In various embodiments, the statistics server 200 comprises a storage 260 storing a control routine 240 and the statistics data 230, a processor circuit 250, and an interface 290 coupling the statistics server 200 to the network 999. In executing a sequence of instructions of at least the control routine 240, the processor circuit 250 is caused to operate the interface 290 to receive signals conveying statistical information and indications of current state of play of a game event from the collection device 100 via the network 999. The processor circuit 250 is caused to store the received statistical information concerning game events as part of the statistics data 230. The statistics data 230 is organized to correlate game events to individual players and/or teams; locations and/or dates played; types of plays (e.g., runs, passes, punts, kicks, dunks, captures, kills, surrenders, checking of kings, etc.); official calls made (e.g., fouls, time-outs, penalties, etc.); etc. Depending on the type of game and/or the statistics received, the processor circuit 250 is caused to perform various mathematical and/or other operations based on scoring rules, etc. to augment the statistics data 230 to reflect the incoming statistics (e.g., adding distances, discounting previously earned points due to penalties, etc. The processor circuit 250 then operates the interface 290 to transmit the statistics data 230, and possibly indications of the current state of play of game events as received from the collection device 100, to the presentation device 600.

It should be noted that in various embodiments, the functions of the collection device 100 and the statistics server 200 may be performed by a single computing device. This is envisioned as possible in installations of the milestone presentation system 1000 that incorporate a game event monitoring system of simpler design.

In various embodiments, the scheduling device 400 comprises a storage 460 storing a control routine 440 and the scheduling data 430, a processor circuit 450, and an interface 490 coupling the scheduling device 400 to the network 999. In executing a sequence of instructions of at least the control routine 440, the processor circuit 450 is caused to maintain the scheduling data 430 comprising at least a schedule of game events. The scheduling device 400 may further comprise one or both of controls 420 and a display 480 implementing a user interface by which at least portions of the scheduling data 430 may be provided as an alternative to or in addition to receiving at least portions of the scheduling data 430 from other computing devices via the network 999. At intervals, upon receipt of a request from the presentation server 600, and/or in response to other criterion or triggers, the processor circuit 450 then operates the interface 490 to transmit the scheduling data 430 to the presentation device 600.

It should be noted that the scheduling data 430 may comprise a larger amount of scheduling data associated with more than times, dates and/or locations of game events. By way of example, an educational institution employing the milestone presentation system 1000 may employ the scheduling device 400 to maintain a calendar of various events related to their institution, possibly including holidays, exam periods, exam preparation days, closings for weather, start and end dates of classes, etc.

In various embodiments, the presentation server 600 comprises a storage 660, a processor circuit 650, and an interface 690 coupling the presentation server 600 to the network 999. The storage 660 stores one or more of the milestones data 632, the alerts data 634, the prediction data 636, the account data 638, and received copies of the statistics data 230 and the scheduling data 430. In executing a sequence of instructions of at least the control routine 640, the processor circuit 650 is caused to operate the interface 690 to receive signals conveying a copy of the statistics data 230 from the statistics server 200 and the scheduling data 430 from the scheduling device 400, and to store those copies in the storage 660. The processor circuit 650 is then caused to search the statistics data 230 for instances of achieving milestones specified in the milestones data 632, and to employ the scheduling data 430 in analyzing the statistics data 230 to predict possible upcoming opportunities for achieving milestones specified in the alerts data 634. Such predictions are stored as the prediction data 636. The processor circuit 650 is further caused to operate the interface 690 to transmit announcements of the achieved milestones and alerts of milestones predicted to be achieved via the network 999 to one or more of the presentation devices 700a-c. Which ones of the presentation devices 700a-c are to receive the announcements and/or the alerts, and/or in what format, may be specified by the account data 638, which the processor circuit 650 may allow to be updated by one or more of the presentation devices 700a-c via the network 999.

The presentation device 600 may further comprise one or both of controls 620 and a display 680 implementing a user interface by which at least portions of one or both of the milestones data 632 and the alerts data 634 may be more directly provided to the presentation device 600 as an alternative to or in addition to receiving at least portions of each from other computing devices via the network 999. As yet another possible alternative, such a user interface may be operable to control the importation of data files of a database comprising one or more of the statistics data 230, the scheduling data 430, the milestones data 632 and/or the alerts data 634 from another computing device.

In various embodiments, each of the presentation devices 700a-c comprises a storage 760 storing a control routine 740 and possibly a video data 738, a processor circuit 750, controls 720, a display 780, and an interface 790 coupling each of the collection devices 700a-c to the network 999. In executing a sequence of instructions of at least the control routine 740, the processor circuit 750 of each of the presentation devices 700a-c is caused to await receipt of signals conveying announcements of milestones achieved and/or alerts of milestones predicted to soon be achieved via the network 999, and to present those received sentences. Depending on various aspects of each of the presentation devices 700a-c, the presentation may be visual or aural, and/or may require the announcements and/or alerts to be formatted into any of a variety of device-specific machine-readable formats. Further, where the presentation of such announcements and/or alerts is visual, such a presentation may combine frames of the video data 638 (possibly comprising video of a game event) overlain by text of the announcements and/or the alerts.

In various embodiments, each of the processor circuits 150, 250, 450, 650 and 750 may comprise any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor circuits may comprise a multi-core processor (whether the multiple cores coexist on the same or separate dies), and/or a multi-processor architecture of some other variety by which multiple physically separate processors are in some way linked.

In various embodiments, each of the storages 160, 260, 460, 660 and 760 may be based on any of a wide variety of information storage technologies, possibly including volatile technologies requiring the uninterrupted provision of electric power, and possibly including technologies entailing the use of machine-readable storage media that may or may not be removable. Thus, each of these storages may comprise any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 290, 490, 690 and 790 employ any of a wide variety of signaling technologies enabling each of computing devices 100, 200, 400, 600 and 700 to be coupled through the network 999 as has been described. Each of these interfaces comprises circuitry providing at least some of the requisite functionality to enable such coupling. However, each of these interfaces may also be at least partially implemented with sequences of instructions executed by corresponding ones of the processor circuits 150, 250, 450, 650 and 750 (e.g., to implement a protocol stack or other features). Where one or more portions of the network 999 employs electrically and/or optically conductive cabling, corresponding ones of the interfaces 190, 290, 490, 690 and 790 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of the interfaces 190, 290, 490, 690 and 790 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190, 290, 490, 690 and 790 are depicted as a single block, one or more of these may comprise multiple interfaces that may be based on differing signaling technologies. This may be the case especially where one or more of these interfaces couples corresponding ones of the computing devices 100, 200, 400, 600 and 700 to more than one network, each employing differing communications technologies.

In various embodiments, each of the controls 120, 420, 620 and 720 may comprise any of a variety of types of manually-operable controls, including without limitation, lever, rocker, pushbutton or other types of switches; rotary, sliding or other types of variable controls; touch sensors, proximity sensors, heat sensors or bioelectric sensors, etc. Each of the controls 120, 420, 620 and 720 may comprise manually-operable controls disposed upon a casing of corresponding ones of the computing devices 100, 400, 600 and 700, and/or may comprise manually-operable controls disposed on a separate casing of a physically separate component of corresponding ones of these computing devices (e.g., a remote control coupled to other components via infrared signaling). Alternatively or additionally, the controls 120, 420, 620 and 720 may comprise any of a variety of non-tactile user input components, including without limitation, a microphone by which sounds may be detected to enable recognition of a verbal command; a camera through which a face or facial expression may be recognized; an accelerometer by which direction, speed, force, acceleration and/or other characteristics of movement may be detected to enable recognition of a gesture; etc.

In various embodiments, each of the displays 180, 480, 680 and 780 may be based on any of a variety of display technologies, including without limitation, a liquid crystal display (LCD), including touch-sensitive, color, and thin-film transistor (TFT) LCD; a plasma display; a light emitting diode (LED) display; an organic light emitting diode (OLED) display; a cathode ray tube (CRT) display, etc. Each of these displays may be disposed on a casing of corresponding ones of the computing devices 100 and 700, or may be disposed on a separate casing of a physically separate component of corresponding ones of these computing devices (e.g., a flat panel monitor coupled to other components via cabling).

FIGS. 2, 3, 4 and 5, taken together, illustrate block diagrams of portions of the block diagram of FIG. 1 in greater detail. More specifically, aspects of the operating environments of the computing devices 100, 200, 400, 600 and 700a-c are depicted, in which corresponding ones of the processor circuits 150, 250, 450, 650 and 750 (FIG. 1) are caused by execution of respective control routines 140, 240, 440, 640 and 740 to perform the aforedescribed functions. As will be recognized by those skilled in the art, each of the control routines 140, 240, 440, 640 and 740, including the components of which each is composed, are selected to be operative on whatever type of processor or processors are selected to implement each of the processor circuits 150, 250, 450, 650 and 750, respectively.

In various embodiments, one or more of the control routines 140, 240, 440, 640 and 740 may comprise a combination of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor circuits 150, 250, 450, 650 and 750, including without limitation, Windows™, OS X™, Linux®, or Android OS™. Where one or more device drivers are included, those device drivers may provide support for any of a variety of other components, whether hardware or software components, that comprise one or more of the computing devices 100, 300, 400, 600 and 700a-c.

Each of the control routines 140, 240, 440, 640 and 740 comprises a communications component 149, 249, 449, 649 and 749, respectively, executable by corresponding ones of the processor circuits 150, 250, 450, 650 and 750 to operate corresponding ones of the interfaces 190, 290, 490, 590 and 790 to transmit and receive signals via the network 999 as has been described. As will be recognized by those skilled in the art, each of these communications components are selected to be operable with whatever type of interface technology is selected to implement each of the corresponding ones of these interfaces.

Figure 2:
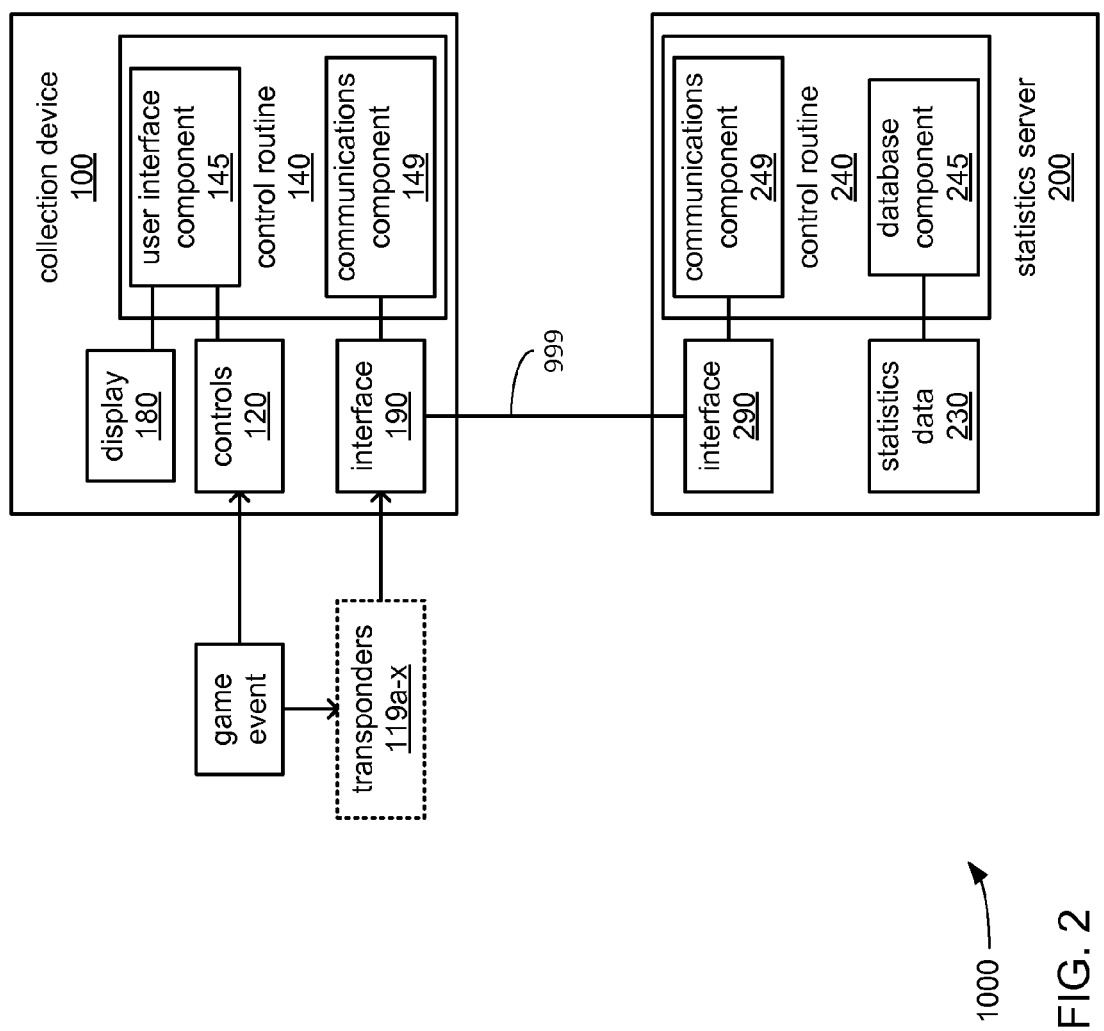
FIG. 2 illustrates a portion of the embodiment of FIG. 1.

Turning more specifically to FIG. 2, the control routine 140 comprises a user interface component 145 executable by the processor circuit 150 to operate the display 180 and/or the controls 120 to either enable entry of statistics of a game event directly and/or to control aspects of the receipt of signals by a component of the interface 190 from one or more transponders 119a-x (if present) that may accompany the collection device 100. As previously discussed, players, vehicles, goal locations, etc. may be provided with one or more of the transponders 119a-x installed and configured to automate provision of statistics concerning play of a game event to the collection device 100, including laps completed, locations of players and/or vehicles, goals scored, etc.

The control routine 240 comprises a database component 245 executable by the processor circuit 250 to maintain and update the statistics data 230 with new statistics received from the collection device 100 concerning a game event monitored via the collection device 100 and/or one or more of the transponders 119a-x. At recurring intervals, in response to the ending of a game event, and/or in response to other criterion, the statistics data 230 is transmitted via the network 999 from the statistics server 200 to the presentation server 600.

It should be noted that the user interface component 145, alternatively or additionally, may be operable to enable access to the statistics data 230 stored within the statistics server 200 remotely via the network 999. By way of example, the user interface component 145 may comprise a web browser or other data viewing/editing routine interacting with the database component 245 such that the processors 150 and 250 are caused to cooperate to enable manual entry and/or editing of statistics data relating to one or more game events within the statistics data 230. Alternatively, where the functions of the collection device 100 and the statistics server 200 are performed by a single computing device, the user interface component 145 may coexist within the same control routine of that single computing device as the database component 245, thereby enabling such direct access to the statistics data 230 without an exchange of signals across the network 999.

Figure 3:
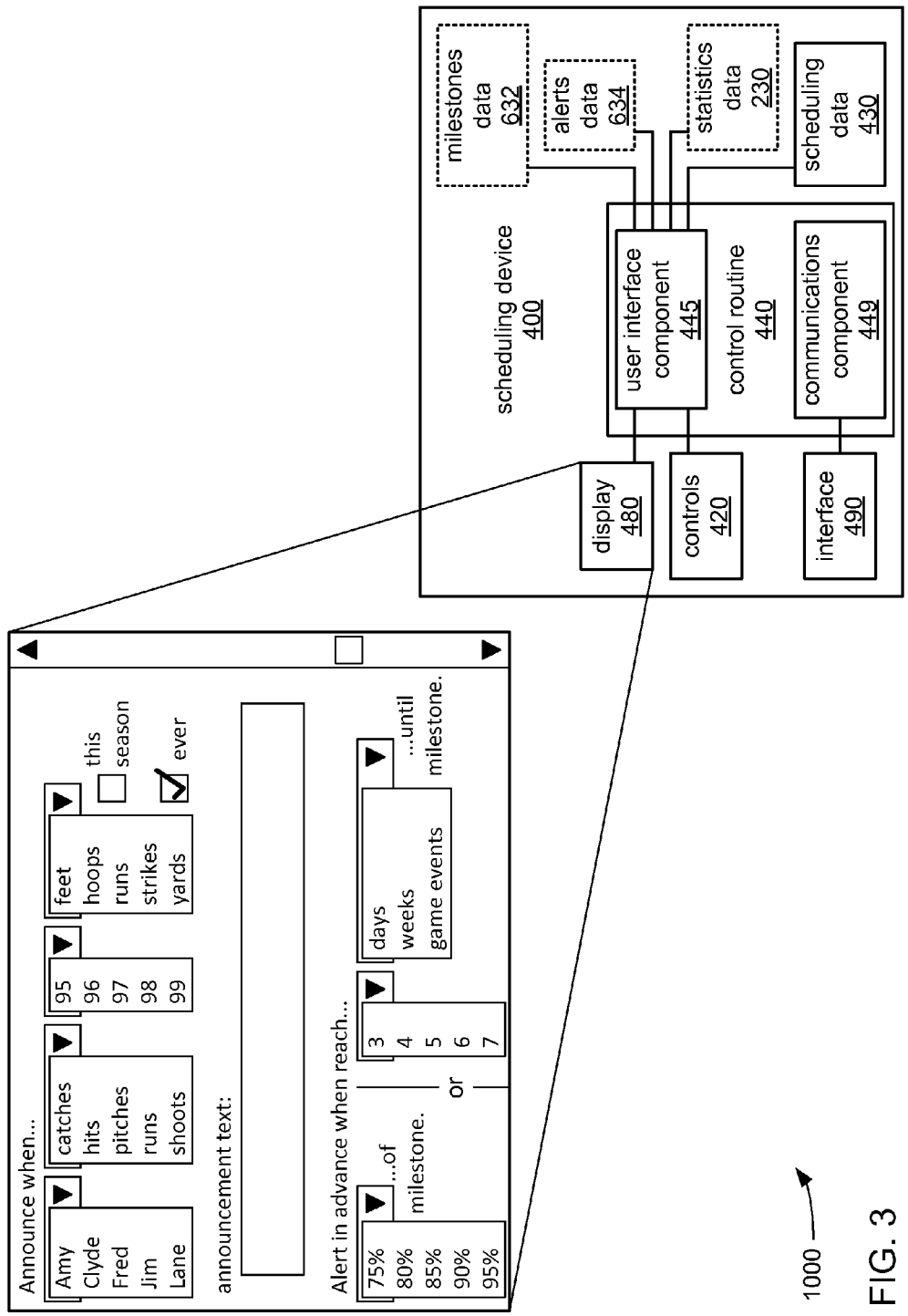
FIG. 3 illustrates a portion of the embodiment of FIG. 1.

Turning more specifically to FIG. 3, the control routine 440 comprises a user interface component 445 executable by the processor circuit 450 to operate the display 480 and/or the controls 420 to enable entry or editing of information within the scheduling data 430 stored within the scheduling device 400. Thus, a user interface of the scheduling device 400 itself may be provided to allow entry of indications of upcoming game events, and possibly also indications of upcoming events that are unrelated to a game, especially where the scheduling data 430 is employed as part of a larger general scheduling system maintained by an organization that engages in numerous activities beyond a game. Again, by way of example where the organization is a school, college or other educational institution, events related to academics (class dates, exam dates, etc.) and administration (staff meetings, alumni events, etc.) of that educational institution may also be maintained by the scheduling device 400 within the scheduling data 430.

Alternatively or additionally, the scheduling data 430 may be made remotely accessible via the network 999 to enable entry and/or editing of schedules of events (whether related to a game, or not) via user interfaces provided by other computing devices. This is envisioned as possible where the scheduling device 400 is maintained by (or at the behest of) a relatively large organization for which a relatively large number and variety of events are scheduled on a regular basis. Regardless of the exact manner in which scheduling information within the scheduling data 430 is entered or edited, considerable detail related to the playing of games events may be included in the scheduling data 430 that goes beyond the mere times and dates on which upcoming game events are to be played. By way of example, availability of specific players, scheduled restrictions of the transmission of announcements and/or alerts to one or more of the presentation devices 700a-c, indications of whether participation in an upcoming game event and/or its scheduled date is for certain or is in some way provisional, and still further information may be included.

It should be noted that the user interface component 445, alternatively or additionally, may be operable to enable access to the milestones data 632 and/or the alerts data 634 stored within the presentation server 600 remotely via the network 999. By way of example, the user interface component 445 may comprise a web browser, terminal emulator or other remote data viewing/editing routine interacting with the control routine 640 such that the processors 450 and 650 are caused to cooperate to enable manual entry and/or editing of milestones to be specified in the milestones data 632 as triggers for the transmission of announcements once those milestones are achieved, and/or of conditions specified in the alerts data 634 as triggers for the transmission of alerts concerning milestones that are predicted to be achieved.

FIG. 3 additionally depicts an example of a portion of visual aspects of a user interface that may be visually presented on the display 480 to enable entry and/or editing of such milestones and/or such conditions stored as part of the milestones data 632 and/or the alerts data 634, respectively. Specifically, an example is depicted of a series of so-called "drop-down" menus and "check boxes" enabling the selection of a specific player, performing one of a selection of particular game-related activities, a selectable number of times or to a selectable degree, and either during just the current season or all throughout the time they've played a particular game. Further, an example is depicted of a "text box" enabling entry of specific text to be transmitted by the presentation server 600 via the network 999 to one or more of the presentation devices 700a-c once the milestone specified via the drop-down menus and check boxes has been achieved. In addition to text, further provision may be made to select an image to be sent in announcement (e.g., a player's picture, a team's logo, etc.). Also depicted in this example are two alternate sets of drop-down menus enabling the selection of the conditions under which an alert may be transmitted by the presentation server 600 notifying audience members of a milestone predicted to be achieved. As shown, the conditions may be a player progressing to a selectable extent towards achieving the milestone or coming within a selectable amount of time of a predicted date of achieving the milestone. Not specifically depicted may also be another text box enabling entry of specific text to be transmitted by the presentation server 600 as part of such an alert triggered by the selected conditions. In providing such selections, the user interface component 445 may require access to one or both of the statistics data 230 and the scheduling data 430 to retrieve available options to present for selection (e.g., the names of the players of a team as retrieved from the statistics data 230, etc.). It should be noted that despite this specific depiction of the visual portion of such a user interface, various embodiments may employ any of a variety of possible user interfaces incorporating any of a variety of mechanisms for specifying milestones, etc. (e.g., "fill-in-the-blank" entries for names, amounts, etc.), various ones of which may or may not employ a visual presentation.

Figure 4:
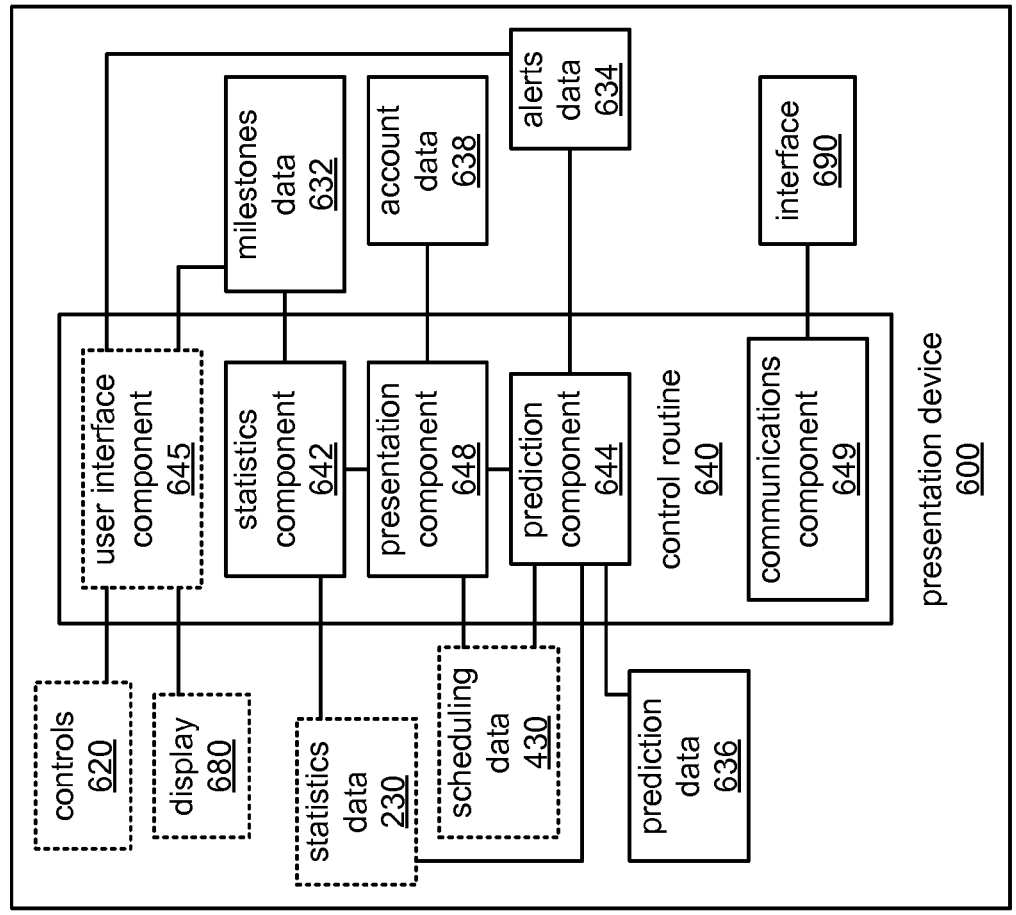
FIG. 4 illustrates a portion of the embodiment of FIG. 1.

Turning more specifically to FIG. 4, the control routine 640 may comprise a user interface component 645 executable by the processor circuit 650 to operate the display 680 and/or the controls 620 to enable entry or editing of information within the presentation server 600, including the milestones data 632 and the alerts data 634. Thus, a user interface of the presentation server 600 itself may be provided to allow entry of milestone achievements to trigger announcements and/or conditions to trigger alerts of predicted milestone achievements, possibly employing aspects of visual presentation discussed in detail and depicted in FIG. 3 with respect to the user interface component 445. However, unlike the user interface component 445, such use of the user interface component 645 (if present) is able to take advantage of the storage of all four of the statistics data 230, the scheduling data 430, the milestones data 632 and the alerts data 634 locally within the presentation server 600.

The control routine 640 comprises a presentation component 648 executable by the processor circuit 650 to transmit announcements and/or alerts to differing ones of the presentation devices 700a-c via the network 999. In so doing, the presentation component 648 employs indications in the account data 638 of which ones of the presentation devices 700a-c are to receive announcements or alerts, and/or in what format(s). More specifically, the account data 638 may specify preferences of users of each of the presentation devices 700a-c as to what sorts of announcements and/or alerts they wish to receive via each of those devices. By way of example, it may be that one of the users has indicated that they wish to receive only announcements of achievement of milestones by a particular player, and not for any other player or for any team. By way of another example, it may be that one of the users has specified restrictions as to when (e.g., what days of a week, what times of a day, etc.) they wish to receive announcements and/or alerts. It may be that the processor circuit 650 is caused to make available a website and/or to provide some other mechanism via the network 999 by which users of each of the presentation devices 700a-c are able to operate their respective presentation devices 700a-c to signal the presentation server 600 with indications of such preferences regarding announcements and/or alerts.

Further, the account data 638 may specify particular data formats and/or protocols to be employed in transmitting announcements and/or alerts to one or more of the presentation devices 700a-c. By way of example, the particular type of computing device of which one or more of the presentation devices 700a-b is comprised may correspond to a particular network protocol that, in turn, dictates the use of a particular machine-readable format in which the announcements and/or alerts must be transmitted via the network 999. Specifically, where that one of the presentation devices 700a-c is a computer system incorporating a web browser by which its user views content provided by other computing devices across the network 999 via its display 780, the automatically generated sentences may be formatted into HTML (hypertext markup language), XML (extensible markup language), SGML (standard generalized markup language), PDF (portable data format), JSON (JavaScript object notation), etc. Alternatively, where that one of the presentation devices 700a-c is a handheld computing device such as a smart phone having a relatively small form of the display 780, the automatically generated sentences may be formatted for transmission via the network 999 as SMS (short message service) or IM (instant messenger) text messages more appropriate for a smaller display.

In causing the processor circuit 650 to transmit such announcements and/or alerts, the presentation component also causes the processor circuit 650 to refer to the scheduling data 430 for any indication of days, times of day, and/or other scheduled conditions under which such transmissions are specified as restricted from taking place such that transmission may need to be delayed to a later time or date. By way of example, it may be that the scheduling data 430 specifies specific date(s) on which no announcements or alerts are to be transmitted out of respect for the death of a player out of concern that such transmissions at such a time may be regarded as unseemly. By way of another example, where the milestone presentation system 1000 is operated by an educational institution, there may be days or times arising from final exams or other academic events for which it is desired to delay such transmissions until a later date after such academic events to avoid distracting students.

The control routine 640 comprises a statistics component 642 executable by the processor circuit 650 to search the statistics data 230, either during or following play of a game event, to identify which ones of the milestones specified in the milestones data 632 have been achieved. Signals received from one or both of the collection device 100 and the statistics server 200 (possibly relaying a signal from the collection device 100) to the effect that a game event has started, is underway or has ended may be employed to trigger such searching of the statistics data 230 and/or the transmission of announcements of achieved milestones. Upon identifying such achieved milestones, the statistics component 642 triggers use of the presentation component 648 in transmitting announcements of the achievement of those milestones. As has been previously discussed, the milestones data 632 may also specify the text to be employed in those announcements, thereby enabling the wording of those announcements to be customized for each milestone achieved.

The control routine 640 comprises a prediction component 644 executable by the processor circuit 650 to search the statistics data 230 to identify which ones of the milestones specified in the alerts data 634 have progressed towards achievement to an extent that meets conditions specified in the alerts data 634 as triggering the transmission of an alert predicting that the milestone will soon be achieved. As previously discussed, the condition triggering transmission of an alert may be that the progress towards achieving a milestone has reached an extent specified in the alerts data 634 (e.g., the depicted example in FIG. 3 where a selectable percentage of a milestone being achieved may serve as the condition that triggers transmission). However, as also previously discussed, the condition triggering transmission of an alert may be that progress towards achieving a milestone has reached an extent that it is predicted to be achieved within a specified amount of time (e.g., the depicted example if FIG. 3 where a prediction of an amount of time within of a selectable number of days, weeks or game events may serve as the condition that triggers transmission).

Regardless of what the condition is or how it is specified and stored in the alerts data 634, whether or not an alert is transmitted may be further conditioned on whether sufficient opportunity remains in a game season for a player or team to actually achieve a particular milestone. Stated differently, progress towards reaching a particular milestone may be such that achievement of the milestone would almost certainly be realized within moments of commencement of play of another game event, but may still be rendered unachievable as a result of there simply being no more game events remaining to be played in the current season. It would therefore be pointless to transmit an alert predicting that the milestone will soon be reached when there is to be no opportunity to do so. To determine whether opportunity to achieve a milestone exists in the remaining game events scheduled in a season, the processor circuit 650 is first caused to make a prediction of the amount of time yet required to achieve that milestone by analyzing the statistics data 230 to derive trends in whatever progress has been made towards achieving that milestones. The processor circuit 650 is then caused to compare that predicted amount of time required to achieve that milestone to the time provided by whatever game events are indicated in the scheduling data 430 as remaining to be played during that season. If the amount of time remaining, as provided by the game events indicated as remaining to be played in the season, is greater than the predicted time required to achieve the milestone, then it is determined by the processor circuit 650 that opportunity does exist for that milestone to be achieved.

Thus, where the condition for a particular milestone is specified in the alerts data 634 as an extent of progress having been made towards achieving the milestone (e.g., a percentage of what needs to be done to achieve the milestone), then transmission of an alert predicting achievement of that milestone may be triggered based on the extent of progress that has been made reaching the extent of progress specified as the condition and based on the predicted amount of time required to achieve the milestone being determined as available in the game events remaining to be played. Correspondingly, where the condition for a particular milestone is specified in the alerts data 634 as an amount of time indicated as needed to reach the milestone (e.g., a specified amount of time required to achieve the milestone expressed either as an amount of playing time required in a unit of time measure or as a number of game events required), then transmission of an alert predicting achievement of that milestone may be triggered based on the predicted amount of time required to achieve the milestone being determined to be less than both the amount of time specified as the condition and the amount of time determined as available in the game events remaining to be played.

It should be noted, and as those familiar with the scheduling of game events (particularly in organized sports) will readily recognize, there can be uncertainty in how many game events and/or what game events are still to be played in a game season, at least for particular players and/or teams. This arises principally as a result of some games employing a player and/or team elimination model (e.g., so-called "elimination rounds) for setting what game events are played in which at least some of the game events determine what players and/or what teams will or will not play in future game events in that season. Thus, whether a player or team is to play in an upcoming game event may be determined by whether or not they are victorious in an earlier game event. As a result, the time remaining in a season in which a player and/or a time may be able to continue to make progress towards achieving a milestone may be uncertain and/or may be determinable only to a limited degree at any given time depending on the outcome of an earlier game event. Further, other factors such as injury, illness, disqualification or other causes for unavailability of a player or team may also add uncertainty to how much of an opportunity remains in a season to progress towards achieving a goal, especially where the reason for unavailability is such that it is uncertain when the player or team will be available again. To address such uncertainties, in some embodiments, dates of upcoming game events specified in the scheduling data 430 may in some way be indicated as provisional. Such a provisional marking may be employed to forestall the transmission of an alert of a prediction of achieving a milestone until the provision causing the provisional marking is resolved (e.g., until it is known that the player or team that has been making progress towards that milestone will play that game event on that day such that they will have the opportunity to make further progress).

In some embodiments, the alerts data 634 may specify a quantity of alerts conveying predictions to be made at any given time, within a specified range of dates, etc. This quantity may be a minimum to ensure that audience interest in a game, a team and/or a player is maintained between game events by ensuring there are a minimum number of alerts transmitted. Alternatively, this quantity may be a maximum to ensure that audience members do not start to view the transmission of alerts as an unwelcome nuisance such that they choose to stop receiving them. To fulfill the specified quantity of alerts transmitted, the prediction component 644 may cause the processor circuit 650 to store predictions as part of the prediction data 636, prior to transmitting alerts based on them, to create a queue of predictions from which the specified quantity may be employed in transmissions of alerts. In so doing, the processor circuit 650 may be caused to prioritize the stored predictions by date, selecting the predictions with dates of predicted achievement of their respective milestones that are closest to the current date.

Figure 5:
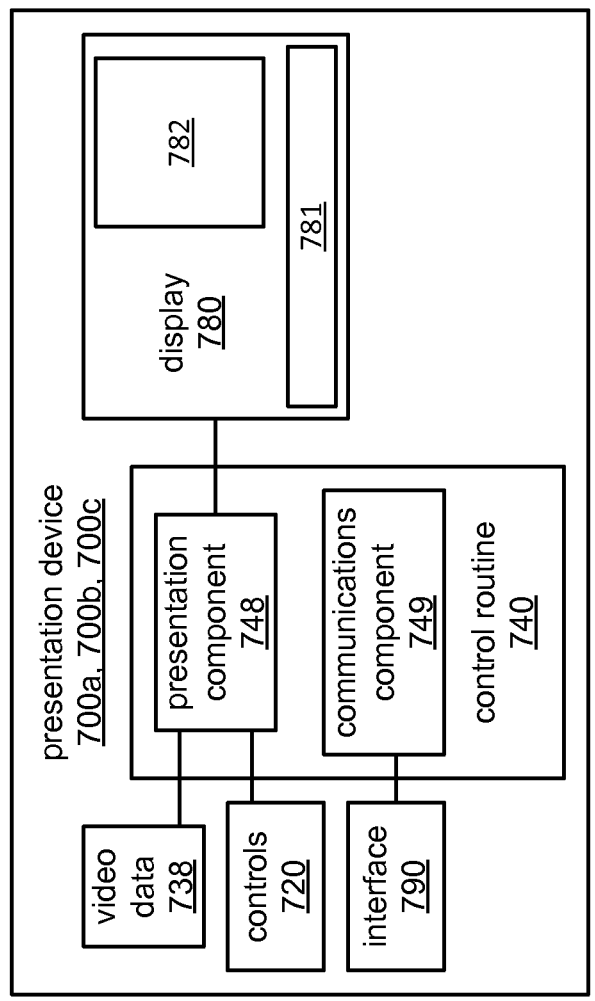
FIG. 5 illustrates a portion of the embodiment of FIG. 1.

Turning more specifically to FIG. 5, the control routine 740 comprises a presentation component 748 to at least cause a visual presentation of announcements and/or alerts received from the presentation server 700 via the network 999 on the display 780. Alternatively or additionally, the presentation component 748 may cause an audible (e.g., synthesized pronunciation of text via a speaker) and/or other form of presentation of such announcements and/or alerts.

Where a visual presentation is made, either or both of text and any accompanying images (e.g., an image of a player's face, a team's logo, etc.) may be visually presented on the display 780. Where a visual presentation of at least text is made, the text may be visually presented along a top of bottom edge of the display 780 such that it may overlie a top or bottom edge of frames of motion video data 738 that is also visually presented (possibly motion video of a game event associated with the text) in a manner commonly referred to as a "ticker" or "crawler" 781. Alternatively, the text may be visually presented in what is commonly referred to as a "pop-up window" 782 that may momentarily overlie a portion of frames of the motion video data 738 that is also visually presented.

In some embodiments in which one or more of the presentation devices 700*a-c* also incorporate the controls 720, the presentation component 748 may further employ the controls 720 and the display 780 to provide a user interface enabling the use of one or more of the presentation devices 700*a-c* to interact with the presentation server 600 via the network 999. More specifically, the presentation component 748 may provide functionality akin to a web browser or terminal emulator that enables a user to access the account data 638 to provide and/or edit preferences for the transmission of announcements and/or alerts to one or more of the presentation devices 700*a-c*.

Figure 6:
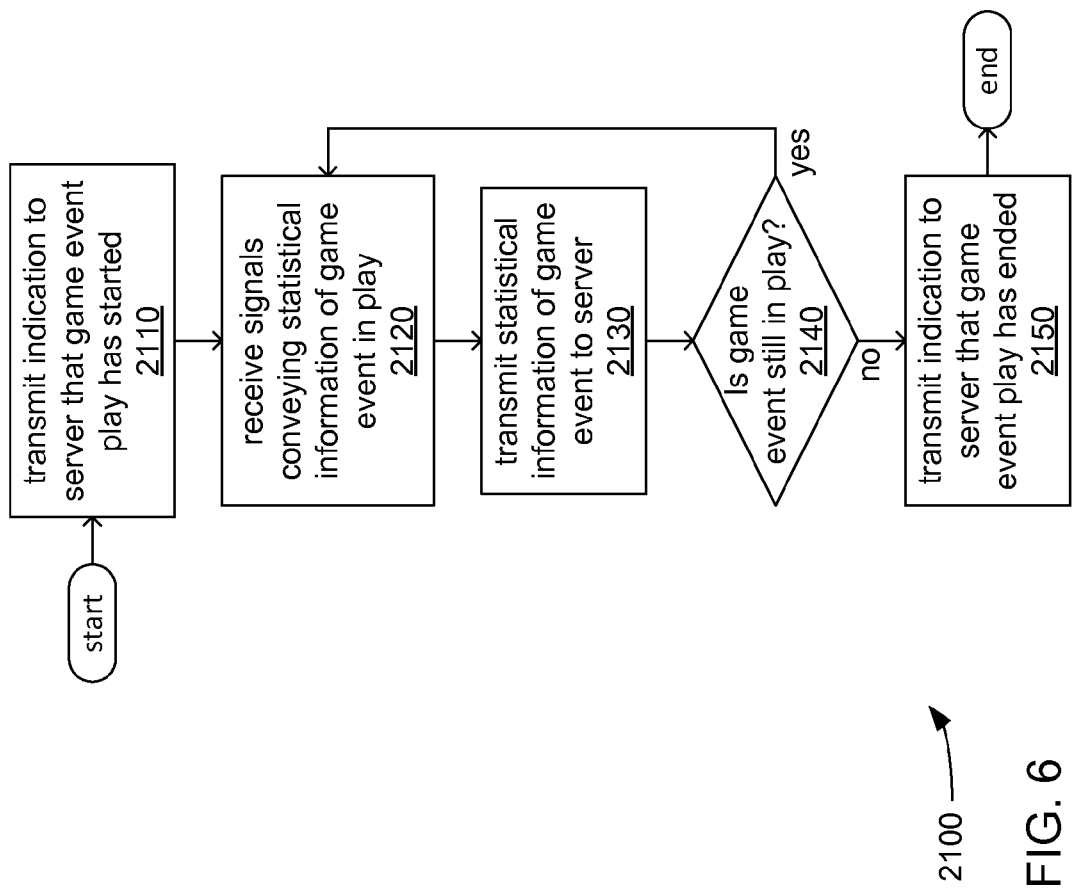
FIG. 6 illustrates an embodiment of a first logic flow.

FIG. 6 illustrates an embodiment of a logic flow 2100. The logic flow 2100 may be representative of some or all of the operations executed by one or more embodiments described herein. More specifically, the logic flow 2100 may illustrate operations performed by the processor circuit 150 of the collection device 100 in executing at least the control routine 140.

At 2110, after awaiting the start of play of a game event, a collection device (e.g., the collection device 100) signals a server (e.g., the statistics server 200, or possibly a server combining the functions of the statistics server 200 and the presentation server 600) that play in the game event has begun. As has been discussed, this signal may serve as a trigger to once again commence searching statistics data for instances of milestones having been achieved, since the commencement of play of a game event will result in additions and updates to the statistics data.

At 2120, the collection device receives signals conveying to it statistical information of the game event in play. As has been discussed, these signals may emanate from controls operated to manually enter the statistical information and/or be received from transponders (or other automated sensors) automatically providing the statistical information. At 2130, the collection device transmits the statistical information to the server, where it is added to the statistics data.

At 2140, a check is made as to whether the game event for which the collection device is collecting statistical information is still in progress. If the game event is still in progress, then the collection device again receives signals conveying more statistical information to it at 2120. However, if the game event is not still in progress, then at 2150, the collection device signals the server within an indication that play has ended in the game event.

Figure 7:
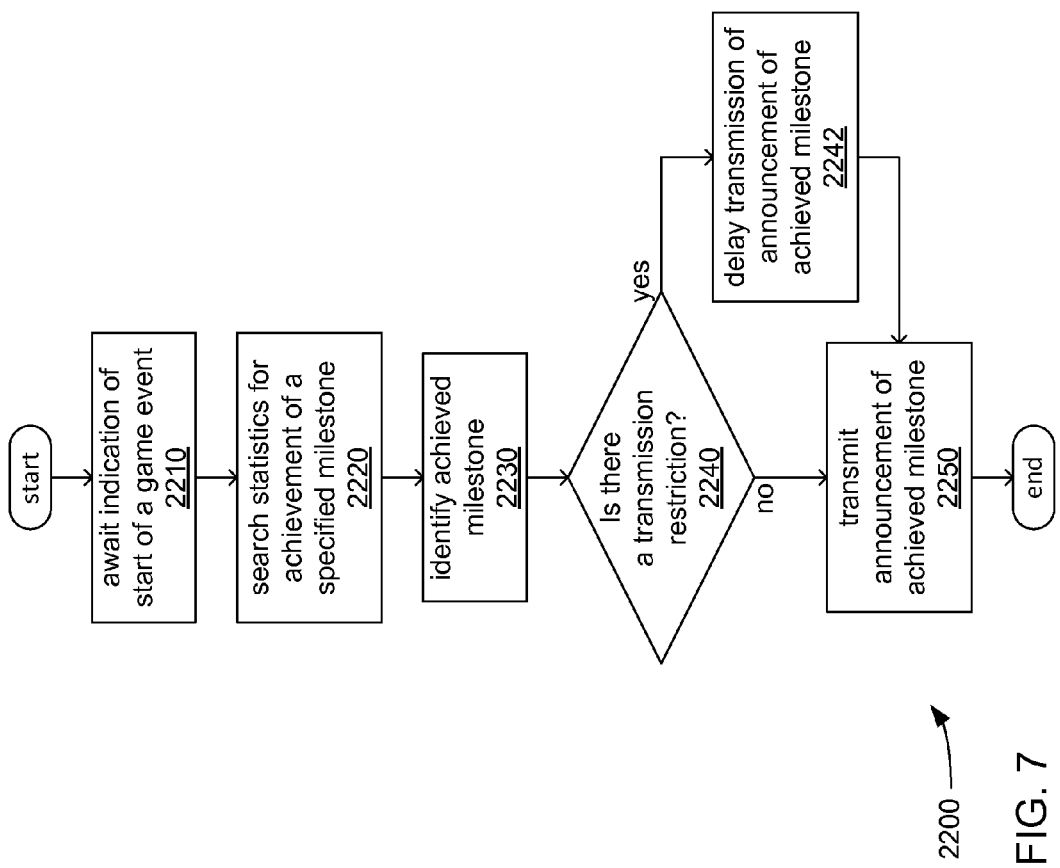
FIG. 7 illustrates an embodiment of a second logic flow.

FIG. 7 illustrates an embodiment of a logic flow 2200. The logic flow 2200 may be representative of some or all of the operations executed by one or more embodiments described herein. More specifically, the logic flow 2200 may illustrate operations performed by at least the processor circuit 650 of the presentation server 600 in executing at least the control routine 640.

At 2210, a presentation server (e.g., the presentation server 600) awaits receipt of a signal indicating the start of a game event. As has been discussed, this signal may be received from the collection device 100 and/or the statistics server 200 as they are employed to monitor the play of that game event.

At 2220, in response to the indication of the start of a game event, the presentation server searches statistics data (e.g., the statistics data 230), possibly even as the statistics data is being updated with new statistics from the play of the game event, for instances of an achievement of a milestone specified in a milestone data (e.g., the milestone data 632). As has been explained, such milestone data comprises indications of team and/or player milestones for which announcements of achievement are to be transmitted upon determination that those milestones have been achieved. At 2230, a milestone that has been achieved is identified.

At 2240, a check is made of a scheduling data (e.g., the scheduling data 430) to determine whether or not there is a scheduled restriction against the transmission of achieved milestones (and possibly also against the transmission of alerts of predictions of when milestones will be achieved) in place. As has been discussed, it may be that other scheduled events are deemed to be sufficiently important that there is a desire not to distract from those other events with such transmissions, and/or a circumstance may have arisen (e.g., a demise of a player, etc.) resulting in it being deemed inappropriate to engage in making such transmission at the current time.

Where no such scheduled restriction is found to be in place, an announcement of the achievement of that milestone is transmitted at 2250 to one or more presentation devices (e.g., one or more of the presentation devices 700*a-c*). As previously explained, the transmission may employ text and/or images specified in the milestone data 632, and/or may be formatted as specified for specific presentation devices in an account data (e.g., the account data 638) comprising indications of preferences for such transmission received from users of those one or more presentation devices. Where such a scheduled restriction is found to be in place, then the transmission of such an announcement is delayed at 2242 until the restriction is no longer in place, before transmission occurs at 2250.

Figure 8:
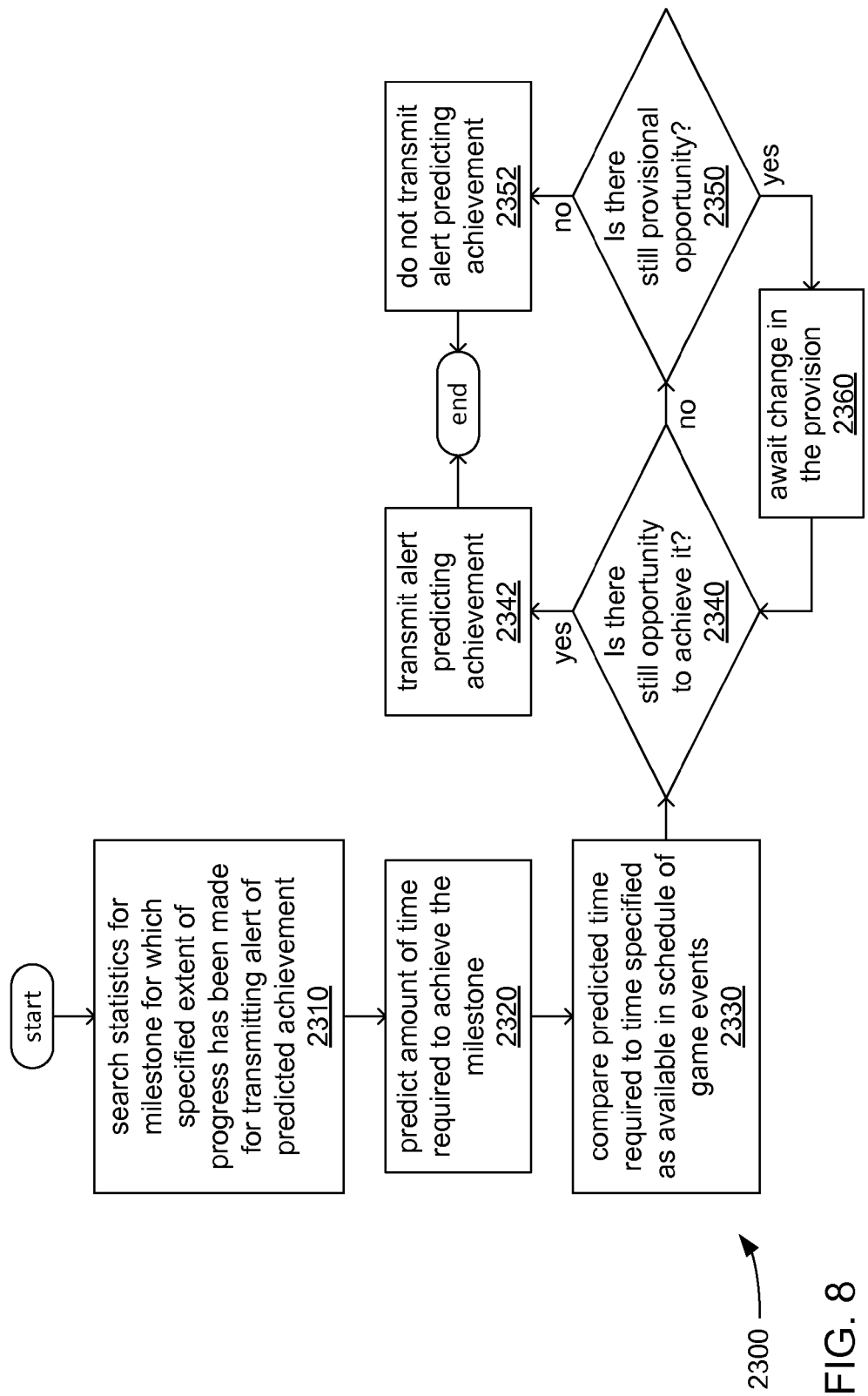
FIG. 8 illustrates an embodiment of a third logic flow.

FIG. 8 illustrates an embodiment of a logic flow 2300. The logic flow 2300 may be representative of some or all of the operations executed by one or more embodiments described herein. More specifically, the logic flow 2300 may illustrate operations performed by at least the processor circuit 650 of the presentation server 600 in executing at least the control routine 640.

At 2310, a presentation server (e.g., the presentation server 600) searches statistics data (e.g., the statistics data 230) for milestones specified in an alerts data (e.g., the alerts data 634) towards which progress has been made in achieving to an extent specified in the alerts data as triggering the transmission of an alert predicting possible upcoming achievement. As previously discussed, such a specification of progress having been made may be indicated in terms of a percentage of progress towards achievement, or in any of a variety of other ways.

At 2320, the presentation server predicts the amount of time required to achieve the milestone based on analyzing a trend or rate of the progress towards achievement that has been made so far. As has been explained, the amount of time required may be expressed as an amount of playing time (across what may be one or more game events) or a number of game events required to take place to provide sufficient opportunity to achieve the milestone.

At 2330, the amount of time predicted as required to achieve the milestone is compared with the amount of time remaining in the current season as indicated in a scheduling data (e.g., the scheduling data 430) comprising indications of the times and dates of game events of the current season. The time remaining, whether expressed as an amount of playing time or as a number of game events, is calculated from what is indicated in the scheduling data as remaining for purposes of this comparison.

At 2340, if there is sufficient remaining time such that the opportunity exists in the season to achieve the milestone, then an alert predicting achievement of the milestone is transmitted by the presentation sever to one or more presentation devices (e.g., the presentation devices 700*a-c*) at 2342. As previously explained, the transmission may employ text and/or images specified in the alerts data 634, and/or may be formatted as specified for specific presentation devices in an account data (e.g., the account data 638) comprising indications of preferences for such transmission received from users of those one or more presentation devices.

However, if the time remaining is insufficient at 2340, then a check is made at 2350 as to whether there is provisionally still sufficient time to provide the necessary opportunity. If not, then it is determined that such an alert is not transmitted at 2352, since there will be no opportunity during the remainder of the season for the milestone to ever be achieved.

However, if provisionally there is still an opportunity for the milestone to be achieved at 2350, then the presentation server 600 refrains from transmitting such an alert and awaits a change in the provision at 2360 such that the amount of time remaining in which to attempt to achieve the milestone will be made more certain, before again checking at 2340 as to whether there is sufficient opportunity. As has been discussed, such uncertainty may arise in sports where the availability of future opportunities to achieve a milestone depend on the outcome of one or more events, such as one or more game events currently being played and/or to be played by the player or team attempting to achieve the milestone.

Figure 9:
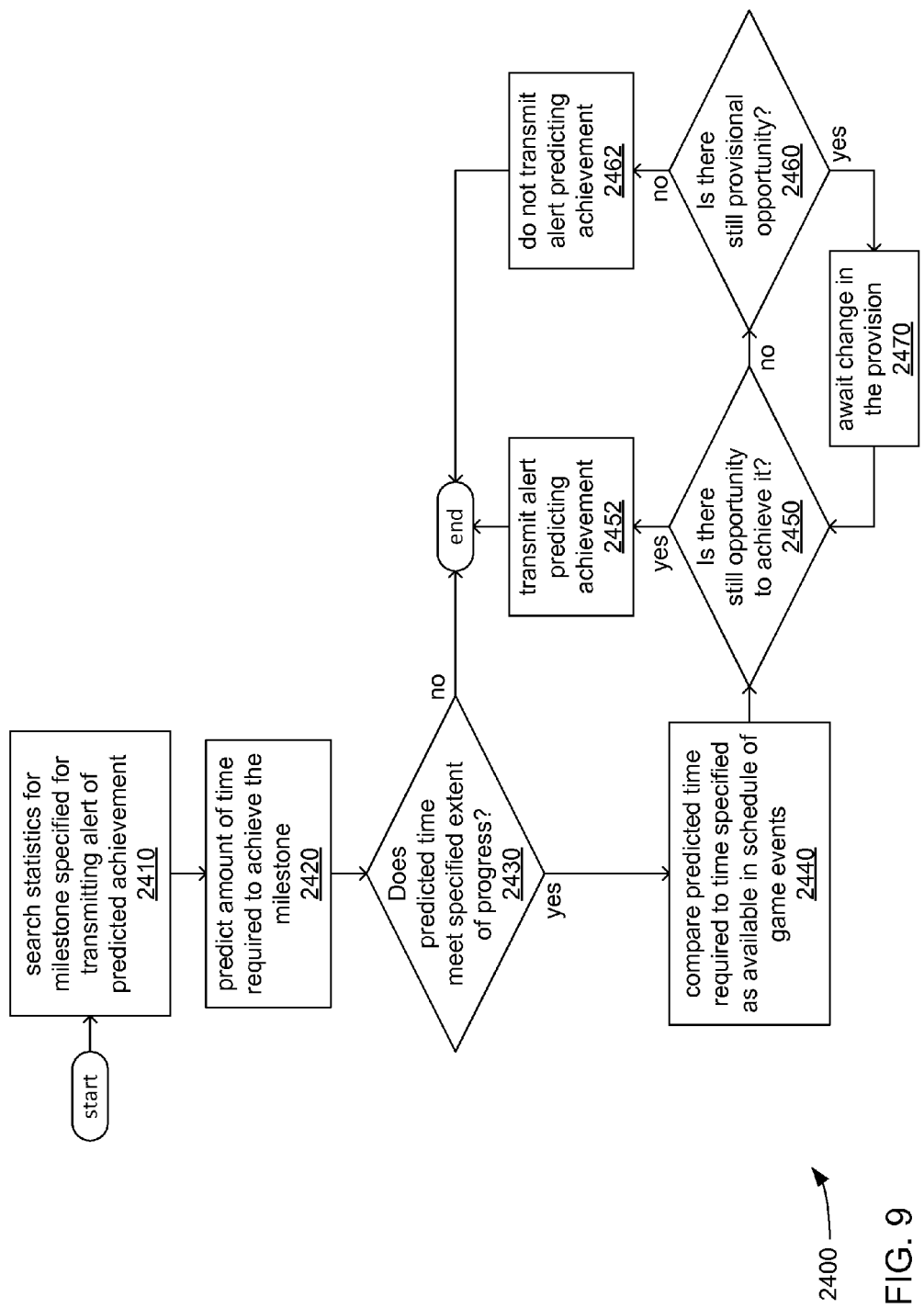
FIG. 9 illustrates an embodiment of a fourth logic flow.

FIG. 9 illustrates an embodiment of a logic flow 2400. The logic flow 2400 may be representative of some or all of the operations executed by one or more embodiments described herein. More specifically, the logic flow 2400 may illustrate operations performed by at least the processor circuit 650 of the presentation server 600 in executing at least the control routine 640.

At 2410, a presentation server (e.g., the presentation server 600) searches statistics data (e.g., the statistics data 230) for a milestones specified in an alerts data (e.g., the alerts data 634) as being a milestone for which an alert predicting achievement is to be transmitted upon meeting conditions also specified in the alerts data. As previously discussed, such conditions may comprise an indication of an amount of time predicted as remaining before the milestone will be achieved. As also previously discussed, that predicted amount of time may be expressed as an amount of playing time until the milestone is predicted to be achieved, or a number of game events to be played until the milestone is predicted to be achieved.

At 2420, the presentation server predicts of the amount of time required to achieve the milestone based on analyzing a trend or rate of the progress towards achievement that has been made so far. Again, this may be expressed as an amount of playing time or a number of game events.

At 2430, a check is made as to whether the predicted time required to achieve the milestone does meet what is specified in the conditions such that an alert may be transmitted. If not, then no such transmission will be made, though it may possibly be made at a later time when the time predicted as required to achieve the milestone has been reduced sufficiently to meet the specified conditions.

However, if the predicted time required to achieve the milestone is low enough to meet the conditions, then at 2440, the amount of time predicted as required to achieve the milestone is compared with the amount of time indicated as remaining in the current season as indicated in a scheduling data (e.g., the scheduling data 430) comprising indications of the times and dates of game events of the current season. The time remaining, whether expressed as an amount of playing time or as a number of game events, is calculated from the indications of scheduled game events in the scheduling data for purposes of this comparison.

At 2450, if there is sufficient remaining time such that the opportunity exists in the season to achieve the milestone, then an alert predicting achievement of the milestone is transmitted by the presentation sever to one or more presentation devices (e.g., the presentation devices 700*a-c*) at 2452. As previously explained, the transmission may employ text and/or images specified in the alerts data 634, and/or may be formatted as specified for specific presentation devices in an account data (e.g., the account data 638) comprising indications of preferences for such transmission received from users of those one or more presentation devices.

However, if the time remaining is insufficient at 2450, then a check is made at 2460 as to whether there is provisionally still sufficient time to provide the necessary opportunity. If not, then it is determined that such an alert is not to be transmitted at 2462, since there will be no opportunity during the remainder of the season for the milestone to ever be achieved.

However, if provisionally there is still an opportunity for the milestone to be achieved at 2460, then the presentation server 600 refrains from transmitting such an alert and awaits a change in the provision at 2470 such that the amount of time remaining in which to attempt to achieve the milestone will be made more certain, before again checking at 2450 as to whether there is sufficient opportunity. As has been discussed, such uncertainty may arise in games where the availability of future opportunities to achieve a milestone depend on the outcome of one or more events, such as one or more game events currently being played and/or to be played by the player or team attempting to achieve the milestone.

Figure 10:
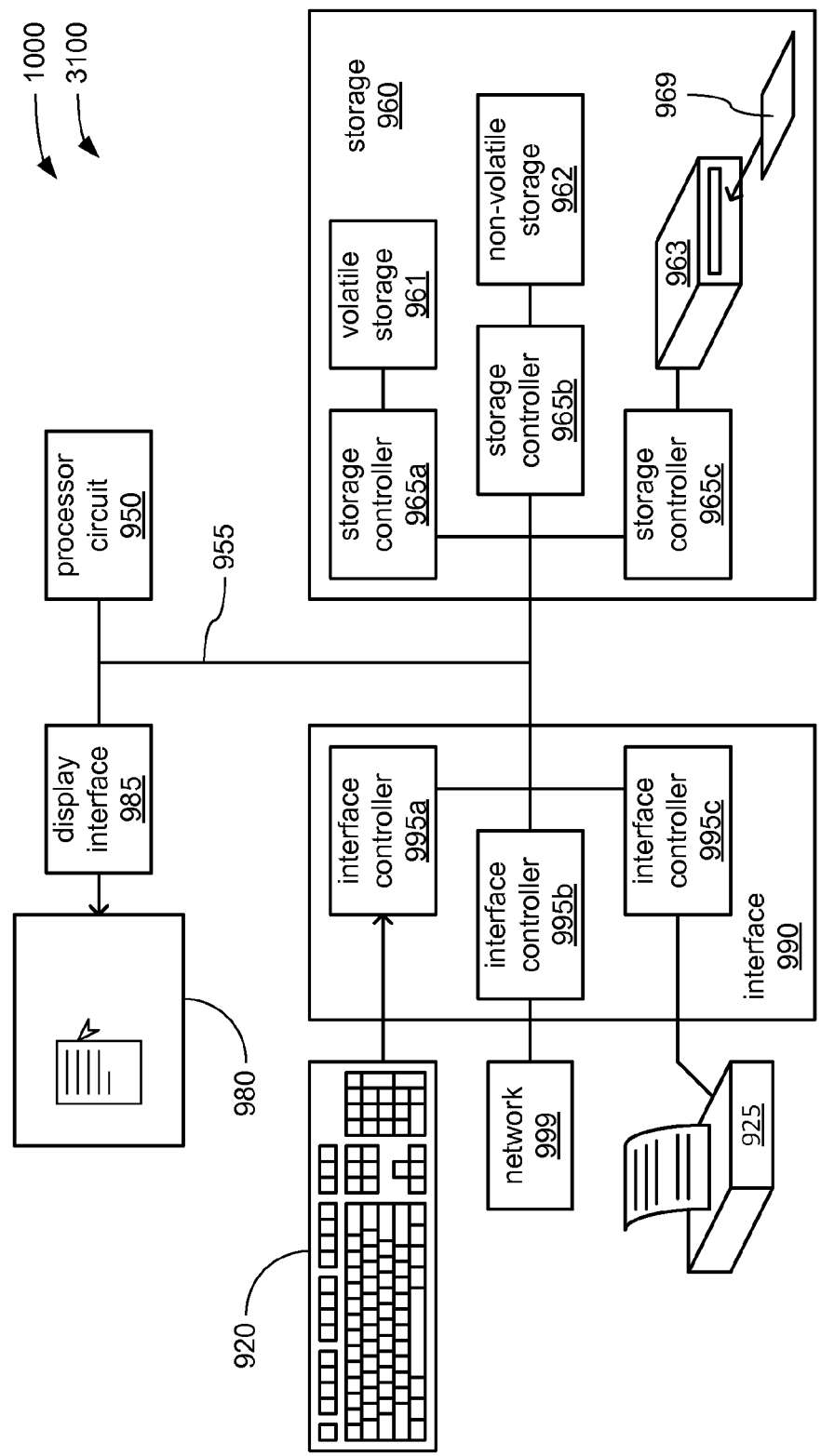
FIG. 10 illustrates an embodiment of a processing architecture.

FIG. 10 illustrates an embodiment of an exemplary processing architecture 3100 suitable for implementing various embodiments as previously described. More specifically, the processing architecture 3100 (or variants thereof) may be implemented as part of one or more of the computing devices 100, 200, 400, 600 and 700a-c. It should be noted that components of the processing architecture 3100 are given reference numbers in which the last two digits correspond to the last two digits of reference numbers of components earlier depicted and described as part of each of the computing devices 100, 200, 400, 600 and 700a-c. This is done as an aid to correlating such components of whichever ones of the computing devices 100, 200, 400, 600 or 700a-c may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, point-to-point interconnects, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 200, 400, 600 or 700a-c implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 250, 450, 650 or 750) may comprise any of a wide variety of commercially available processors, employing any of a wide variety of technologies and implemented with one or more cores physically combined in any of a number of ways.

As previously discussed, the storage 960 (corresponding to one or more of the storages 160, 260, 460, 660 or 760) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and comprises one or more optical and/or solid-state disk drives employing one or more pieces of machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 950 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 950 as that routine is executed.

As previously discussed, the interface 990 (corresponding to one or more of the interfaces 190, 290, 490, 690 and 790) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920 (perhaps corresponding to one or more of the controls 120, 420, 620 and 720). The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or more of the displays 480, 680 and 780), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the devices 100, 200, 400, 600 and 700a-c may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus comprises a processor circuit and a storage communicatively coupled to the processor circuit to store instructions. When the instructions are executed by the processor circuit, the processor circuit is caused to receive a signal that indicates play of a game event; search statistical data stored in the storage and associated with at least one player of a game associated with the game event for an indication of achievement of a first milestone specified in a milestones data based on receipt of the signal; identify the first milestone in the statistical data; search a scheduling data for an indication of a restriction against transmitting an announcement of achievement of the first milestone; and transmit the announcement of achievement of the first milestone to at least one presentation device based on a lack of restriction against transmitting the announcement.

The above example of an apparatus in which the signal that indicates play of the game event is received from a computing device involved in monitoring the game event and comprises a signal that indicates at least one of start of play, receipt of a statistic associated with play, and end of play.

Either of the above examples of an apparatus in which the first milestone comprises a milestone achieved by one of the player or a team that plays the game during a current season.

Any of the above examples of an apparatus in which the scheduling data comprises indications of dates on which game events of the game are played by the one of the player or the team.

Any of the above examples of an apparatus in which the scheduling data comprises indications of academic or administrative events associated with an academic institution.

Any of the above examples of an apparatus in which the processor circuit is caused to visually present a multitude of options on a display for selection to specify the first milestone; receive signals that indicate selection of options that specify the first milestone; and store an indication of the first milestone in the milestones data.

Any of the above examples of an apparatus in which the processor circuit is caused to present a request for text to employ in the announcement; receive signals that convey the text; and store an indication of the text in the milestones data.

Any of the above examples of an apparatus in which the processor circuit is caused to search the statistical data for an indication of a second milestone specified in an alerts data towards the achievement of which an extent of progress meeting a condition specified in the alerts data has been made; identify the second milestone in the statistics data; predict a time required in a current season of the game to achieve the second milestone; compare the predicted time required to an indication of time that remains in scheduled game events in the season that provides an opportunity to achieve the second milestone; search the scheduling data for an indication of a restriction against transmitting an alert predicting achievement of the second milestone; and transmit an alert that predicts achievement of the second milestone based on the indication of the time that remains in the season and based on a lack of restriction against transmitting the alert.

Another example of an apparatus comprises a processor circuit and a storage communicatively coupled to the processor circuit to store instructions. When the instructions are executed by the processor circuit, the processor circuit is caused to search statistical data stored in the storage and associated with at least one player of a game for an indication of a first milestone specified in an alerts data towards the achievement of which an extent of progress that meets a condition specified in the alerts data has been made; identify the first milestone in the statistical data; predict a time required in a current season of the sport to achieve the first milestone; compare the predicted time required to an indication of time that remains in scheduled game events in the season in a scheduling data; and transmit an alert that predicts achievement of the first milestone to at least one presentation device based on the time that remains in the season providing at least the predicted time required.

The above example of another apparatus in which the first milestone comprises a milestone achieved by one of the player or a team that plays the game during a current season.

Either of the above examples of another apparatus in which the scheduling data comprises indications of dates on which game events of the game are played by the one of the player or the team.

Any of the above examples of another apparatus in which the scheduling data comprises indications of academic or administrative events associated with an academic institution.

Any of the above examples of another apparatus in which the processor circuit is caused to visually present a multitude of options on a display for selection to specify the first milestone and the condition that must be met by the extent of progress; receive signals that indicate selection of options that specify the first milestone and the condition; and store an indication of the first milestone and the condition in the alerts data.

Any of the above examples of another apparatus in which the processor circuit is caused to present a request for text to employ in the alert; receive signals that convey the text; and store an indication of the text in the alerts data.

Any of the above examples of another apparatus in which the processor circuit is caused to refrain from transmitting the alert based on the time that remains in the season not providing at least the predicted time required; compare the predicted time required to an indication of time that provisionally remains in scheduled game events in the season in the scheduling data; await a change in the time that provisionally remains; again compare the predicted time required to an indication of time that remains in scheduled game events in the season in the scheduling data following a change in the time that provisionally remains; and transmit the alert based on the time that remains in the season providing at least the predicted time required following the change in the time that provisionally remains.

Any of the above examples of another apparatus in which the processor circuit is caused to search the scheduling data for an indication of a restriction against transmitting the alert predicting achievement of the first milestone and transmit the alert based on a lack of restriction against transmitting the alert.

An example of a computer-implemented method comprises searching statistical data associated with at least one player of a game for an indication of a first milestone specified in an alerts data towards the achievement of which an extent of progress has been made; identifying the first milestone in the statistical data; predicting a time required in a current season of the game to achieve the first milestone; comparing the predicted time required to a condition specified in the alerts data; comparing the predicted time required to an indication of time that remains in scheduled game events in the season in a scheduling data; and transmitting an alert that predicts achievement of the first milestone to at least one presentation device based on the predicted time required meeting the condition and based on the time that remains in the season providing at least the predicted time required.

The above example of a computer-implemented method in which the first milestone comprises a milestone achieved by one of the player or a team that plays the game during a current season.

Either of the above examples of a computer-implemented method in which the scheduling data comprises indications of dates on which game events of the game are played by the one of the player or the team.

Any of the above examples of a computer-implemented method in which the method comprises visually presenting a multitude of options on a display for selection to specify the first milestone and the condition that must be met by the predicted time required; receiving signals that indicate selection of options that specify the first milestone and the condition; and storing an indication of the first milestone and the condition in the alerts data.

Any of the above examples of a computer-implemented method in which the method comprises refraining from transmitting the alert based on the time that remains in the season not providing at least the predicted time required; comparing the predicted time required to an indication of time that provisionally remains in scheduled game events in the season in the scheduling data; awaiting a change in the time that provisionally remains; again comparing the predicted time required to an indication of time that remains in scheduled game events in the season in the scheduling data following a change in the time that provisionally remains; and transmitting the alert based on the time that remains in the season providing at least the predicted time required following the change in the time that provisionally remains.

Any of the above examples of a computer-implemented method in which the method comprises searching the scheduling data for an indication of a restriction against transmitting the alert predicting achievement of the first milestone, and transmitting the alert based on a lack of restriction against transmitting the alert.

Any of the above examples of a computer-implemented method in which the method comprises selecting the alert from a multitude of alerts for transmission based on the predicted time required indicating that the first milestone is predicted to be achieved ahead of other milestones associated with other alerts of the multitude of alerts.

An example of at least one machine-readable storage medium comprises instructions that when executed by a computing device, cause the computing device to search statistical data stored by the computing device and associated with at least one player of a sport for an indication of a first milestone specified in an alerts data towards the achievement of which an extent of progress has been made; identify the first milestone in the statistical data; predict a time required in a current season of the sport to achieve the first milestone; compare the predicted time required to a condition specified in the alerts data; compare the predicted time required to an indication of time that remains in scheduled game events in the season in a scheduling data; and transmit an alert that predicts achievement of the first milestone to at least one presentation device based on the predicted time required meeting the condition and based on the time that remains in the season providing at least the predicted time required.

The above example of at least one machine-readable medium in which the computing device is caused to visually present a multitude of options on a display for selection to specify the first milestone and the condition that must be met by the predicted time required; receive signals that indicate selection of options that specify the first milestone and the condition; and store an indication of the first milestone and the condition in the alerts data.

Either of the above examples of at least one machine-readable storage medium in which the computing device is caused to refrain from transmitting the alert based on the time that remains in the season not providing at least the predicted time required; compare the predicted time required to an indication of time that provisionally remains in scheduled game events in the season in the scheduling data; await a change in the time that provisionally remains; again compare the predicted time required to an indication of time that remains in scheduled game events in the season in the scheduling data following a change in the time that provisionally remains; and transmit the alert based on the time that remains in the season providing at least the predicted time required following the change in the time that provisionally remains.

Either of the above examples of at least one machine-readable storage medium in which the computing device is caused to search the scheduling data for an indication of a restriction against transmitting the alert predicting achievement of the first milestone; and transmit the alert based on a lack of restriction against transmitting the alert.

The invention claimed is:
1. An apparatus comprising:
a processor circuit; and
a storage communicatively coupled to the processor circuit to store instructions that when executed by the processor circuit cause the processor circuit to:
receive a signal that indicates play of a game event;
search statistical data stored in the storage and associated with at least one player of a game associated with the game event for an indication of a first milestone specified in an alerts data towards the achievement of which an extent of progress meeting a condition specified in the alerts data has been made based on receipt of the signal;
identify the first milestone in the statistical data;
predict a time required in a current season of the game to achieve the first milestone;
compare the predicted time required to an indication of time that provisionally remains in scheduled game events in the season that provides an opportunity to achieve the first milestone;
compare the predicted time required to an indication of time that remains in scheduled game events in the season in the scheduling data following a change in the time that provisionally remains;
determine, from account data, one or more presentation devices that are to receive an alert predicting achievement of the first milestone, the account data associated with users different from the at least one player;
search a scheduling data for a scheduled condition that indicates a restriction against transmitting an alert predicting achievement of the first milestone to the determined one or more presentation devices, the scheduling data comprising game event data and event data unrelated to a game event; and
transmit the alert that predicts achievement of the first milestone to the determined one or more presentation devices based on the time that remains in the season providing at least the predicted time required following the change in the time that provisionally remains and based on a lack of restriction against transmitting the alert.

2. The apparatus of claim 1, the signal that indicates play of the game event is received from a computing device involved in monitoring the game event and comprises a signal that indicates at least one of start of play, receipt of a statistic associated with play, and end of play.

3. The apparatus of claim 1, the first milestone comprising a milestone to be achieved by one of the player or a team that plays the game during a current season.

4. The apparatus of claim 3, the scheduling data comprising indications of dates on which game events of the game are played by the one of the player or the team.

5. The apparatus of claim 4, the scheduling data comprising indications of academic or administrative events associated with an academic institution.

6. The apparatus of claim 1, the processor circuit caused to:
visually present a multitude of options on a display for selection to specify the first milestone;
receive signals that indicate selection of options that specify the first milestone; and
store an indication of the first milestone in the milestones data.

7. The apparatus of claim 6, the processor circuit caused to:
present a request for text to employ in the alert;
receive signals that convey the text; and
store an indication of the text in the milestones data.

8. The apparatus of claim 1, the processor circuit caused to:
search the statistical data for an indication of achievement of a second milestone specified in a milestones data;
identify the second milestone in the statistical data;
search the scheduling data for an indication of a restriction against transmitting an announcement of achievement of the second milestone; and
transmit the announcement of achievement of the second milestone based on a lack of restriction against transmitting the alert.

9. An apparatus comprising:
a processor circuit; and
a storage communicatively coupled to the processor circuit to store instructions that when executed by the processor circuit cause the processor circuit to:
search statistical data stored in the storage and associated with at least one player of a game for an indication of a first milestone specified in an alerts data towards the achievement of which an extent of progress that meets a condition specified in the alerts data has been made;
identify the first milestone in the statistical data;
predict a time required in a current season of the game to achieve the first milestone;
compare the predicted time required to an indication of time that remains in scheduled game events in the season in a scheduling data;
determine, from account data, one or more presentation devices that are to receive an alert predicting achievement of the first milestone, the account data associated with users different from the at least one player;
search a scheduling data for a scheduled condition that indicates a restriction against transmitting the alert predicting achievement of the first milestone to the determined one or more presentation devices, the scheduling data comprising game event data and event data unrelated to a game event; and
transmit an alert that predicts achievement of the first milestone the determined one or more presentation devices based on the time that remains in the season providing at least the predicted time required and on a lack of restriction against transmitting the alert.

10. The apparatus of claim 9, the first milestone comprising a milestone achieved by one of the player or a team that plays the game during a current season.

11. The apparatus of claim 10, the scheduling data comprising indications of dates on which game events of the game are played by the one of the player or the team.

12. The apparatus of claim 11, the scheduling data comprising indications of academic or administrative events associated with an academic institution.

13. The apparatus of claim 9, the processor circuit caused to:
visually present a multitude of options on a display for selection to specify the first milestone and the condition that must be met by the extent of progress;
receive signals that indicate selection of options that specify the first milestone and the condition; and
store an indication of the first milestone and the condition in the alerts data.

14. The apparatus of claim 13, the processor circuit caused to:
present a request for text to employ in the alert;
receive signals that convey the text; and
store an indication of the text in the alerts data.

15. The apparatus of claim 9, the processor circuit caused to:
refrain from transmitting the alert based on the time that remains in the season not providing at least the predicted time required;

compare the predicted time required to an indication of time that provisionally remains in scheduled game events in the season in the scheduling data;
await a change in the time that provisionally remains;
again compare the predicted time required to an indication of time that remains in scheduled game events in the season in the scheduling data following a change in the time that provisionally remains; and
transmit the alert based on the time that remains in the season providing at least the predicted time required following the change in the time that provisionally remains.

16. A computer-implemented method comprising:
searching statistical data associated with at least one player of a game for an indication of a first milestone specified in an alerts data towards the achievement of which an extent of progress has been made;
identifying the first milestone in the statistical data;
predicting a time required in a current season of the game to achieve the first milestone;
comparing the predicted time required to a condition specified in the alerts data;
comparing the predicted time required to an indication of time that remains in scheduled game events in the season in a scheduling data;
determining, from account data, one or more presentation devices that are to receive an alert predicting achievement of the first milestone, the account data associated with users different from the at least one player;
searching a scheduling data for a scheduled condition that indicates a restriction against transmitting the alert predicting achievement of the first milestone to the determined one or more presentation devices, the scheduling data comprising game event data and event data unrelated to a game event; and
transmitting an alert that predicts achievement of the first milestone the determined one or more presentation devices based on the predicted time required meeting the condition and based on the time that remains in the season providing at least the predicted time required and on a lack of restriction against transmitting the alert.

17. The computer-implemented method of claim 16, the first milestone comprising a milestone achieved by one of the player or a team that plays the game during a current season.

18. The computer-implemented method of claim 17, the scheduling data comprising indications of dates on which game events of the game are played by the one of the player or the team.

19. The computer-implemented method of claim 16, comprising:
visually presenting a multitude of options on a display for selection to specify the first milestone and the condition that must be met by the predicted time required;
receiving signals that indicate selection of options that specify the first milestone and the condition; and
storing an indication of the first milestone and the condition in the alerts data.

20. The computer-implemented method of claim 16, comprising:
refraining from transmitting the alert based on the time that remains in the season not providing at least the predicted time required;
comparing the predicted time required to an indication of time that provisionally remains in scheduled game events in the season in the scheduling data;
awaiting a change in the time that provisionally remains;
again comparing the predicted time required to an indication of time that remains in scheduled game events in the season in the scheduling data following a change in the time that provisionally remains; and
transmitting the alert based on the time that remains in the season providing at least the predicted time required following the change in the time that provisionally remains.

21. The computer-implemented method of claim 16, comprising selecting the alert from a multitude of alerts for transmission based on the predicted time required indicating that the first milestone is predicted to be achieved ahead of other milestones associated with other alerts of the multitude of alerts.

22. At least one machine-readable storage medium comprising instructions that when executed by a computing device, cause the computing device to:
search statistical data stored by the computing device and associated with at least one player of a sport for an indication of a first milestone specified in an alerts data towards the achievement of which an extent of progress has been made;
identify the first milestone in the statistical data;
predict a time required in a current season of the sport to achieve the first milestone;
compare the predicted time required to a condition specified in the alerts data;
compare the predicted time required to an indication of time that remains in scheduled game events in the season in a scheduling data;
determine, from account data, one or more presentation devices that are to receive an alert predicting achievement of the first milestone, the account data associated with users different from the at least one player;
search a scheduling data for a scheduled condition that indicates a restriction against transmitting the alert predicting achievement of the first milestone to the determined one or more presentation devices, the scheduling data comprising game event data and event data unrelated to a game event; and
transmit an alert that predicts achievement of the first milestone the determined one or more presentation devices based on the predicted time required meeting the condition and based on the time that remains in the season providing at least the predicted time required and on a lack of restriction against transmitting the alert.

23. The at least one machine-readable storage medium of claim 22, the computing device caused to:
visually present a multitude of options on a display for selection to specify the first milestone and the condition that must be met by the predicted time required;
receive signals that indicate selection of options that specify the first milestone and the condition; and
store an indication of the first milestone and the condition in the alerts data.

24. The at least one machine-readable storage medium of claim 22, the computing device caused to:
refrain from transmitting the alert based on the time that remains in the season not providing at least the predicted time required;
compare the predicted time required to an indication of time that provisionally remains in scheduled game events in the season in the scheduling data;
await a change in the time that provisionally remains;

again compare the predicted time required to an indication of time that remains in scheduled game events in the season in the scheduling data following a change in the time that provisionally remains; and transmit the alert based on the time that remains in the season providing at least the predicted time required following the change in the time that provisionally remains.

\* \* \* \* \*